United States Patent
Shigehisa

(10) Patent No.: US 11,658,326 B2
(45) Date of Patent: May 23, 2023

(54) CELL STACK DEVICE, MODULE, AND MODULE HOUSING DEVICE

(71) Applicant: KYOCERA Corporation, Kyoto (JP)

(72) Inventor: Takashi Shigehisa, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/637,769

(22) PCT Filed: Jul. 28, 2020

(86) PCT No.: PCT/JP2020/028911
§ 371 (c)(1),
(2) Date: Feb. 23, 2022

(87) PCT Pub. No.: WO2021/039251
PCT Pub. Date: Mar. 4, 2021

(65) Prior Publication Data
US 2022/0271319 A1    Aug. 25, 2022

(30) Foreign Application Priority Data
Aug. 30, 2019   (JP) .............................. JP2019-158561

(51) Int. Cl.
*H01M 8/2475*   (2016.01)
*H01M 4/86*   (2006.01)

(52) U.S. Cl.
CPC ....... *H01M 8/2475* (2013.01); *H01M 4/8621* (2013.01); *H01M 2004/8689* (2013.01)

(58) Field of Classification Search
CPC ............. H01M 8/1231; H01M 8/2428; H01M 8/2457; H01M 8/2475; H01M 8/2485; H01M 2008/1293; H01M 2004/8689; C25B 9/63
See application file for complete search history.

(56) References Cited

U.S. PATENT DOCUMENTS

| | | |
|---|---|---|
| 2009/0004532 A1 | 1/2009 | Haltiner, Jr. et al. |
| 2009/0301898 A1 | 12/2009 | Backhaus-Ricoult |
| 2011/0136029 A1 | 6/2011 | Shimura et al. |

FOREIGN PATENT DOCUMENTS

| | | | |
|---|---|---|---|
| CN | 102106024 A | | 6/2011 |
| JP | 2009-158143 A | | 7/2009 |
| JP | 2011-525287 A | | 9/2011 |
| JP | 2012-178968 | * | 9/2012 |
| JP | 2012-178968 A | | 9/2012 |
| JP | 2013-157191 A | | 8/2013 |
| JP | 2019-057407 | * | 4/2019 |

(Continued)

OTHER PUBLICATIONS

English translation of JP Publication 2019-057407, Apr. 2019.*

(Continued)

*Primary Examiner* — Brittany L Raymond
(74) *Attorney, Agent, or Firm* — Procopio Cory Hargreaves and Savitch LLP

(57) ABSTRACT

A cell stack device includes a cell stack, a holding member, and a positive electrode terminal. The cell stack is constructed by stacking a plurality of cells. The holding member holds the cells. The positive electrode terminal functions as a positive electrode when power generated by the cell stack is output to the outside. The potential of the positive electrode terminal is not more than that of the holding member.

6 Claims, 23 Drawing Sheets

(56) References Cited

FOREIGN PATENT DOCUMENTS

WO        2019/013269 A1     1/2019
WO   WO 2019-013269     *   1/2019

OTHER PUBLICATIONS

Decision to Grant a Patent for the corresponding JP Application No. 2020-566862, dated Aug. 2, 2021, 5 pages.
Notice of Reasons for Refusal for the corresponding JP Application No. 2020-566862, dated Mar. 9, 2021, 6 pages.
International Search Report for the corresponding JP Application No. PCT/JP2020/028911 dated Oct. 20, 2020, 2 pages.

* cited by examiner

CELL STACK DEVICE, MODULE, AND MODULE HOUSING DEVICE

CROSS-REFERENCE TO RELATED APPLICATION(S)

This application is a national stage application of International Application No. PCT/JP2020/028911, filed on Jul. 28, 2020, which designates the United States, the entire contents of which are herein incorporated by reference, and which is based upon and claims the benefit of priority to Japanese Patent Application No. 2019-158561, filed on Aug. 30, 2019, the entire contents of which are herein incorporated by reference.

TECHNICAL FIELD

The present disclosure relates to a cell stack device, a module, and a module housing device.

BACKGROUND ART

In recent years, various fuel cell stack devices have been proposed as next-generation energy sources in which a plurality of fuel cells are arranged, each of the fuel cells being a type of cell capable of generating electrical power by using a fuel gas (hydrogen-containing gas) and an oxygen-containing gas (air).

In such a fuel cell stack device, for example, lower ends of the plurality of fuel cells are bonded to a holding member by a fixing material (see Patent Document 1).

CITATION LIST

Patent Literature

Patent Document 1: JP 2013-157191 A

SUMMARY OF INVENTION

A cell stack device according to an aspect of an embodiment of the present disclosure includes a cell stack, a holding member, and a positive electrode terminal. The cell stack is constructed by stacking a plurality of cells. The holding member holds the cells. The positive electrode terminal functions as a positive electrode when power generated by the cell stack is output to the outside. Furthermore, the potential of the positive electrode terminal is not more than that of the holding member.

Furthermore, a module of the present disclosure includes the cell stack device described above in a housing container.

Moreover, a module housing device of the present disclosure includes, in an outer case, the module described above and an auxiliary device for operating the module.

DESCRIPTION OF EMBODIMENTS

Hereinafter, embodiments of a cell stack device, a module, and a module housing device disclosed in the present specification will be described with reference to the accompanying drawings. The disclosure is not limited by the following embodiments.

Furthermore, it is noted that the drawings are schematic and the dimensional relationship between elements, the proportions of elements, and the like may differ from realistic ones. Even between the drawings, there may be a case where portions having different dimensional relationships, proportions, and the like from one another are included.

Configuration of Cell

First, an example of a solid oxide fuel cell will be described as a cell constituting a cell stack device according to an embodiment with reference to FIGS. 1A to 1C.

Figure 1A:
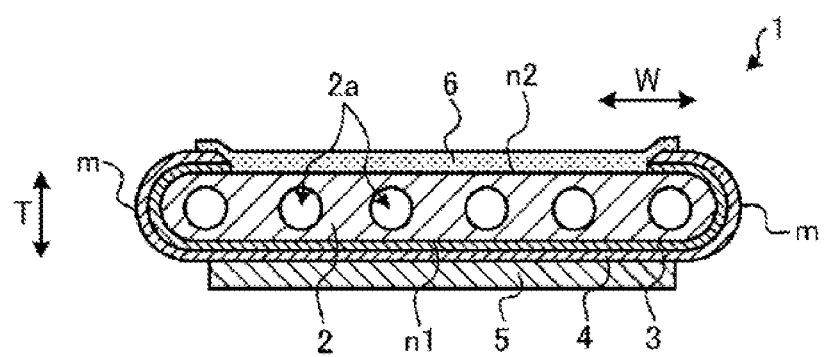
FIG. 1A is a cross-sectional view illustrating an example of a cell according to an embodiment.
Figure 1B:
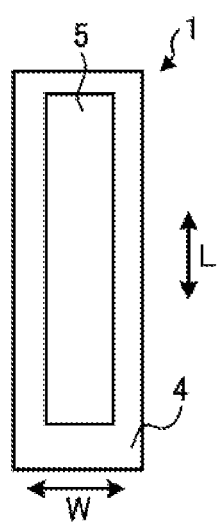
FIG. 1B is a side view illustrating an example of a cell according to an embodiment when viewed from an air electrode side.
Figure 1C:
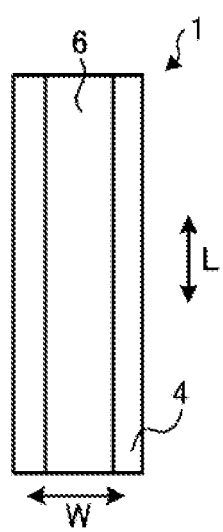
FIG. 1C is a side view illustrating an example of the cell according to the embodiment when viewed from an interconnector side.

FIG. 1A is a cross-sectional view illustrating an example of a cell 1 according to an embodiment, FIG. 1B is a side view illustrating an example of the cell 1 according to the embodiment when viewed from an air electrode 5 side, and FIG. 1C is a side view illustrating an example of the cell 1 according to the embodiment when viewed from an interconnector 6 side. FIGS. 1A to 1C illustrate an enlarged part of each configuration of the cell 1.

In the example illustrated in FIGS. 1A to 1C, the cell 1 is of a hollow flat plate type and has an elongated plate shape. As illustrated in FIG. 1B, the shape of the entire cell 1 when viewed from the side is, for example, a rectangle having a side length of 5 cm to 50 cm in a length direction L and a length of 1 cm to 10 cm in a width direction W orthogonal to the length direction L. The total length (thickness direction T) of the cell 1 is 1 mm to 5 mm.

As illustrated in FIG. 1A, the cell 1 includes a support substrate 2 that is conductive, an element part, and the interconnector 6. The support substrate 2 has a columnar shape having a pair of opposing first flat surface n1 and second flat surface n2, and a pair of arc-shaped side surfaces m that connect the first flat surface n1 and the second flat surface n2.

The element part is provided on the first flat surface n1 of the support substrate 2. The element part has a fuel electrode 3, a solid electrolyte layer 4, and an air electrode 5. In the example illustrated in FIG. 1A, the interconnector 6 is provided on the second flat surface n2 of the cell 1.

As illustrated in FIG. 1B, the air electrode 5 does not extend to a lower end of the cell 1. At the lower end of the cell 1, only the solid electrolyte layer 4 is exposed on a surface of the first flat surface n1. As illustrated in FIG. 1C, the interconnector 6 may extend to the lower end of the cell 1. At the lower end of the cell 1, the interconnector 6 and the solid electrolyte layer 4 are exposed on the surface. As illustrated in FIG. 1A, the solid electrolyte layer 4 is exposed on surfaces of the pair of arc-shaped side surfaces m of the cell 1. The interconnector 6 need not extend to the lower end of the cell 1.

Hereinafter, respective constituent members constituting the cell 1 will be described.

The support substrate 2 is provided therein with gas flow paths 2a through which a gas flows. FIG. 1A illustrates an example in which the support substrate 2 has six gas flow paths 2a extending along the length direction. The support substrate 2 has gas permeability and allows fuel gas to permeate to the fuel electrode 3. The support substrate 2 illustrated in FIG. 1A has conductivity. The support substrate 2 can collect electricity generated in the element part via the interconnector 6.

The material of the support substrate 2 contains, for example, an iron group metal component and an inorganic oxide. For example, the iron group metal component may be Ni and/or NiO. For example, the inorganic oxide may be a specific rare earth element oxide.

As the material of the fuel electrode 3, a generally known material may be used. The fuel electrode 3 can be formed from a porous conductive ceramic, for example, a ceramic containing a solid solution of a calcium oxide, a magnesium oxide, or a rare earth element oxide in $ZrO_2$ and Ni and/or NiO. As the rare earth element oxide, for example, $Y_2O_3$ or the like is used. Hereinafter, a solid solution of a calcium oxide, a magnesium oxide, or a rare earth element oxide in $ZrO_2$ is referred to as stabilized zirconia. In the present disclosure, stabilized zirconia also includes partially stabilized zirconia.

The solid electrolyte layer 4 is an electrolyte and bridges ions between the fuel electrode 3 and the air electrode 5. At the same time, the solid electrolyte layer 4 has a gas blocking property and makes it difficult for fuel gas and oxygen-containing gas to leak.

The material of the solid electrolyte layer 4 is, for example, a solid solution of 3 mol % to 15 mol % of a rare earth element oxide in $ZrO_2$. As the rare earth element oxide, for example, $Y_2O_3$ or the like is used. Another material may be used as the material of the solid electrolyte layer 4 as long as it has the above characteristics.

The material of the air electrode 5 is not particularly limited as long as it is generally used for an air electrode. The material of the air electrode 5 may be, for example, a conductive ceramic such as a so-called $ABO_3$ type perovskite type oxide.

The material of the air electrode 5 may be, for example, a composite oxide in which Sr and La coexist in the A site. Examples of such a composite oxide include $La_xSr_{1-x}Co_yFe_{1-y}O_3$, $La_xSr_{1-x}MnO_3$, $La_xSr_{1-x}FeO_3$, $La_xSr_{1-x}CoO_3$, and the like. Here, x is 0<x<1 and y is 0<y<1.

Furthermore, the air electrode 5 has gas permeability. The open porosity of the air electrode 5 may be 20% or more, and is particularly in the range of 30% to 50%.

As the material of the interconnector 6, a lanthanum chromite-based perovskite type oxide ($LaCrO_3$-based oxide), a lanthanum strontium titanium-based perovskite type oxide ($LaSrTiO_3$-based oxide), or the like may be used. These materials have conductivity, and are neither reduced nor oxidized even when they come into contact with a fuel gas such as a hydrogen-containing gas, and an oxygen-containing gas such as air.

Furthermore, the interconnector 6 is dense and makes it difficult for the fuel gas flowing through the gas flow paths 2a formed in the support substrate 2 and the oxygen-containing gas flowing outside the support substrate 2 to leak. The interconnector 6 may have a relative density of 93% or more, particularly 95% or more.

Configuration of Cell Stack Device

Figure 2A:
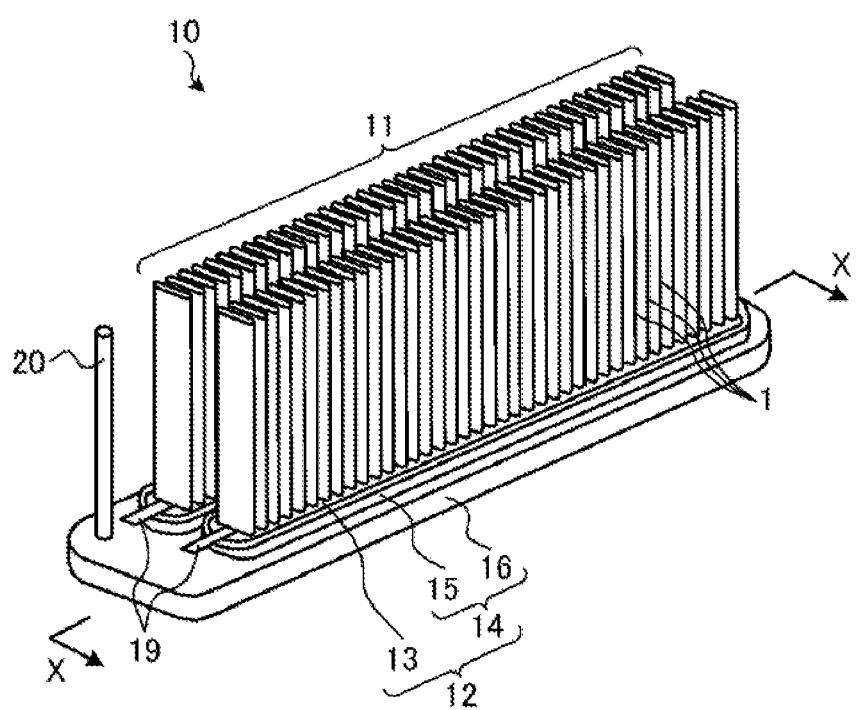
FIG. 2A is a perspective view illustrating an example of a cell stack device according to the embodiment.

Next, a cell stack device 10 according to the present embodiment using the aforementioned cell 1 will be described with reference to FIGS. 2A to 2C. FIG. 2A is a perspective view illustrating an example of the cell stack device 10 according to the embodiment, FIG. 2B is a cross-sectional view taken along line X-X illustrated in FIG. 2A, and FIG. 2C is a top view illustrating an example of the cell stack device 10 according to the embodiment.

As illustrated in FIG. 2A, the cell stack device 10 includes a cell stack 11 having a plurality of cells 1 arranged (stacked) in the thickness direction T (see FIG. 1A) of the cells 1, and a fixing member 12.

The fixing member 12 has a fixing material 13 and a holding member 14. The holding member 14 holds the cells 1. The fixing material 13 fixes the cells 1 to the holding member 14. Furthermore, the holding member 14 has a holding body 15 and a gas tank 16. The holding body 15 and the gas tank 16, which constitute the holding member 14, are made of metal and have conductivity.

Figure 2B:
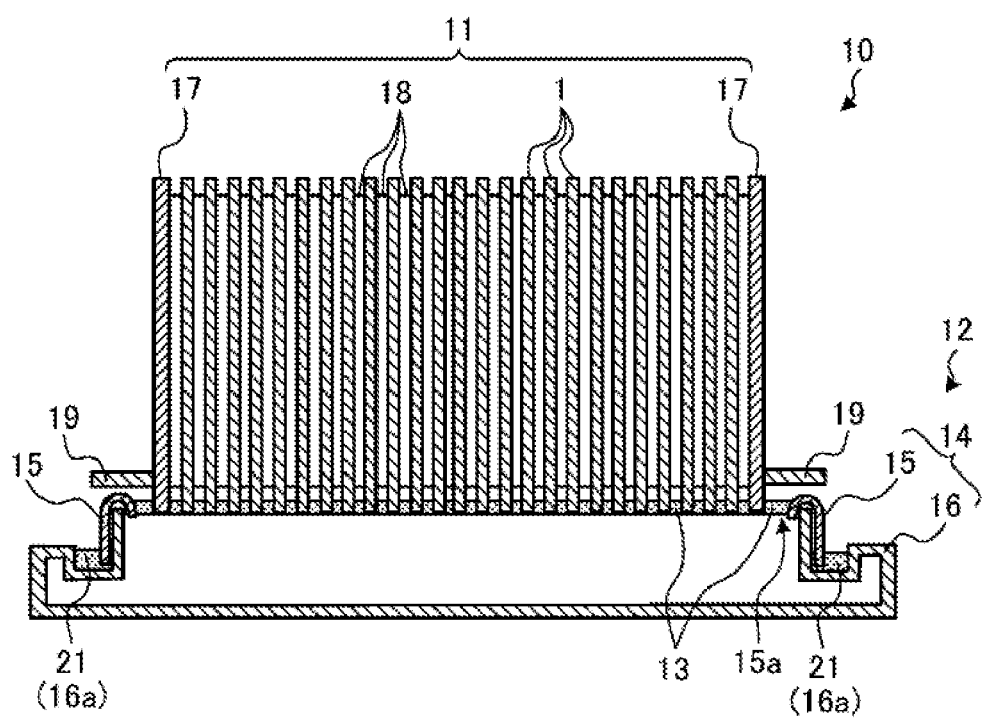
FIG. 2B is a cross-sectional view taken along the line X-X illustrated in FIG. 2A.
Figure 2C:
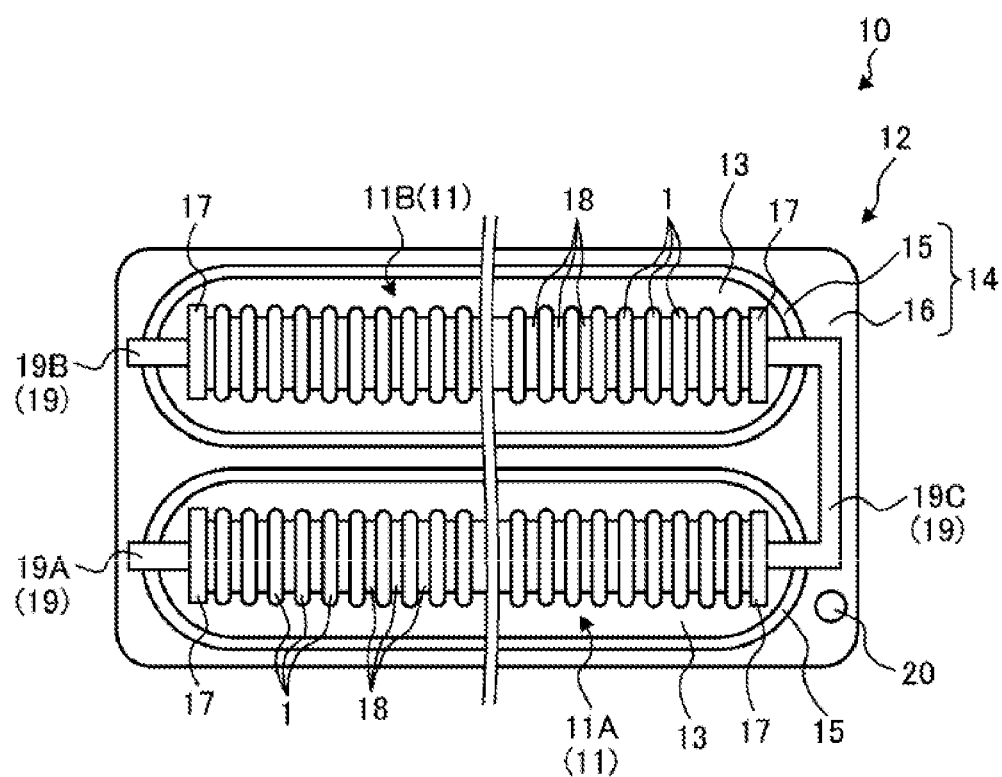
FIG. 2C is a top view illustrating an example of the cell stack device according to the embodiment.

As illustrated in FIG. 2B, the holding body 15 has an insertion hole 15a into which the lower ends of the plurality of cells 1 are inserted. The lower ends of the plurality of cells 1 and the inner wall of the insertion hole 15a are bonded by the fixing material 13.

The gas tank 16 has an opening for supplying a reaction gas to the plurality of cells 1 via the insertion hole 15a and a recessed groove 16a provided around the opening. An outer peripheral end of the holding body 15 is bonded to the gas tank 16 by a bonding material 21 filled in the recessed groove 16a of the gas tank 16.

In the example illustrated in FIG. 2A, the fuel gas is stored in an internal space formed by the holding body 15 and the gas tank 16, which constitute the holding member 14. A gas circulation pipe 20 is connected to the gas tank 16. The fuel gas is supplied to the gas tank 16 through the gas circulation pipe 20, and is supplied from the gas tank 16 to the gas flow paths 2a (see FIG. 1A) inside the cells 1. The fuel gas supplied to the gas tank 16 is generated by a reformer 82 (see FIG. 6) to be described below.

Hydrogen-rich fuel gas may be produced, for example, by steam reforming a raw material. The fuel gas produced by steam reforming contains steam.

The example illustrated in FIG. 2A includes two rows of cell stacks 11, two holding bodies 15, and the gas tank 16. Each of the two rows of cell stacks 11 has a plurality of cells 1. Each of the cell stacks 11 is fixed to a corresponding one of the holding bodies 15. The gas tank 6 has two through holes on the upper surface thereof. Each of the holding bodies 15 is disposed in a corresponding one of the through holes. The internal space is formed by one gas tank 6 and two holding bodies 15.

The insertion hole 15a has, for example, an oval shape in the top view. The length of the insertion hole 15a, for example, in the arrangement direction of the cells 1, that is, the thickness direction T, is larger than a distance between two end current collection members 17 located at both ends of the cell stack 11. The width of the insertion hole 15a is, for example, larger than the length of the cell 1 in the width direction W (see FIG. 1A).

As illustrated in FIG. 2A, the fixing material 13 is filled in the bonding portion between the inner wall of the insertion hole 15a and the lower end of the cell 1 and is solidified. Consequently, the inner wall of the insertion hole 15a and the lower ends of the plurality of cells 1 are bonded and fixed, respectively, and the lower ends of the cells 1 are bonded and fixed to each other. The gas flow path 2a of each of the cells 1 communicates with the internal space of the holding member 14 at the lower end.

The fixing material 13 and the bonding material 21 have oxide ion conductivity. The fixing material 13 and the bonding material 21 can use a material having lower conductivity. As a specific material of the fixing material 13 and the bonding material 21, amorphous glass or the like may be used, or particularly, crystallized glass or the like may be used.

As the crystallized glass, for example, any of $SiO_2$—CaO-based, MgO—$B_2O_3$-based. $La_2O_3$—$B_2O_3$—MgO-based. $La_2O_3$—$B_2O_3$—ZnO-based, and $SiO_2$—CaO—ZnO-based materials may be used, or, particularly, a $SiO_2$—MgO-based material may be used.

As illustrated in FIG. 2B, a conductive member 18 for electrically connecting adjacent ones of the cells 1 in series is interposed between adjacent ones of the cells 1. More specifically, the space between the adjacent ones of the cells 1 corresponds to the space between the fuel electrode 3 of one of the adjacent cells 1 and the air electrode 5 of the other one of the adjacent cells 1.

As illustrated in FIG. 2B, the end current collection members 17 are connected to the outermost ones of the cells 1 in the arrangement direction of the plurality of cells 1. The end current collection member 17 is connected to a conductive part 19 protruding outward from the cell stack 11. The conductive part 19 has a function of collecting electricity generated by power generation of the cells 1 and sending the collected electricity to the outside. FIG. 2A does not illustrate the end current collection members 17.

As illustrated in FIG. 2C, in the cell stack device 10, two cell stacks 11A and 11B are connected in series and function as one battery. Therefore, the conductive part 19 of the cell stack device 10 is divided into a positive electrode terminal 19A, a negative electrode terminal 19B, and a connection terminal 19C.

The positive electrode terminal 19A functions as a positive electrode when power generated by the cell stack 11 is output to the outside, and is electrically connected to the end current collection members 17 on a positive electrode side in the cell stack 11A. The negative electrode terminal 19B functions as a negative electrode when power generated by the cell stack 11 is output to the outside, and is electrically connected to the end current collection members 17 on a negative electrode side in the cell stack 11B.

The connection terminal 19C electrically connects the end current collection members 17 on the negative electrode side in the cell stack 11A and the end current collection members 17 on the positive electrode side in the cell stack 11B.

Reference Example

Figure 3A:
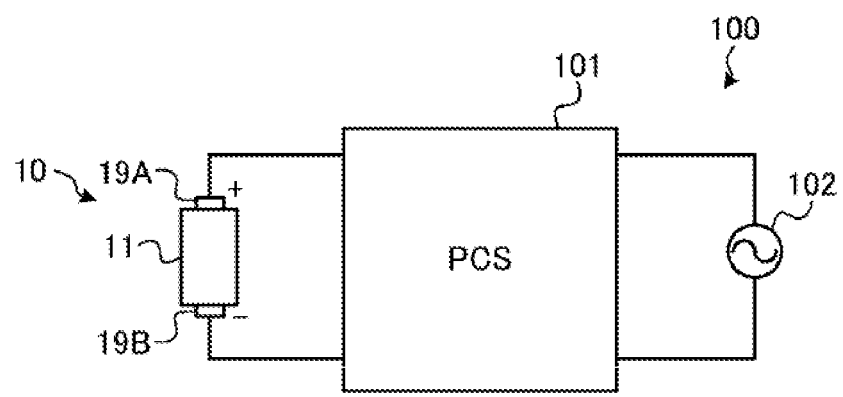
FIG. 3A is a diagram illustrating an example of a power system including a cell stack device of a reference example.
Figure 3B:
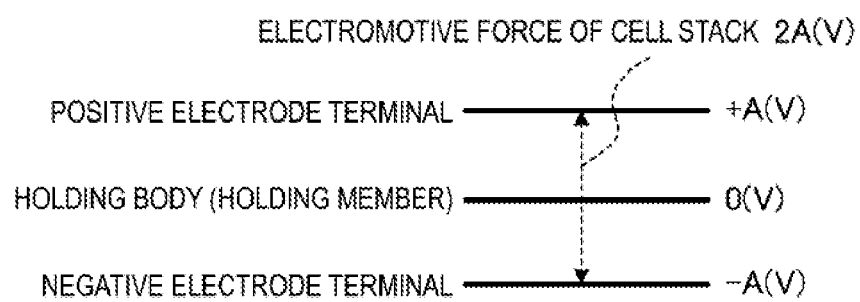
FIG. 3B is a diagram illustrating an example of a magnitude relationship of potentials of respective parts in the cell stack device of the reference example.
Figure 3C:
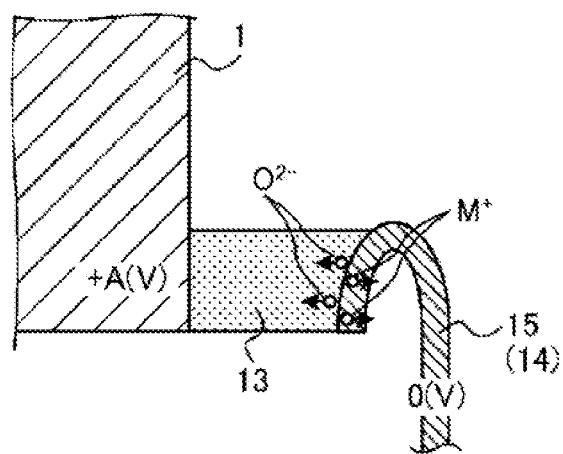
FIG. 3C is a diagram for explaining a phenomenon that occurs in the cell stack device of the reference example.
Figure 3D:
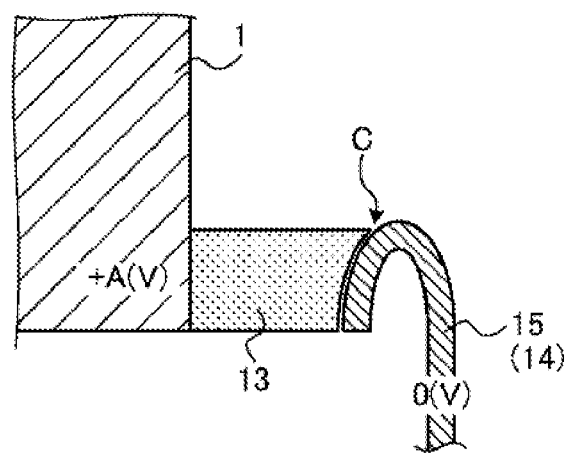
FIG. 3D is a diagram for explaining a phenomenon that occurs in the cell stack device of the reference example.

A reference example illustrated in FIGS. 3A to 3C will be described. FIG. 3A is a diagram illustrating an example of a power system 100 including the cell stack device 10 of the reference example, and FIG. 3B is a diagram illustrating an example of a magnitude relationship of potentials of respective parts in the cell stack device 10 of the reference example. Furthermore, FIGS. 3C and 3D are diagrams for explaining a phenomenon occurring in the cell stack device 10 of the reference example.

As illustrated in FIG. 3A, the power system 100 connects the cell stack device 10 to a power conditioning subsystem (PCS) 101, and supplies power generated by the cell stack device 10 to a power system 102 via the PCS 101.

Specifically, the PCS 101 converts DC power generated by the cell stack device 10 into AC power, and supplies the AC power to the power system 102. Therefore, both the positive electrode terminal 19A and the negative electrode terminal 19B of the cell stack device 10 are connected to the PCS 101.

Furthermore, in the power system 100 illustrated in FIG. 3A, as illustrated in FIG. 3B, when the electromotive force of the cell stack device 10 is set to 2A (V), the potential of the positive electrode terminal 19A is +A (V) and the potential of the negative electrode terminal 19B is −A (V). The electromotive force of the cell stack device 10 is, in other words, the electromotive force of the cell stack 11.

Furthermore, the holding member 14 made of metal and having conductivity is grounded in order to ensure stable operation of the cell stack device 10. The holding member 14 includes the holding body 15 and the gas tank 16. That is, the potential of the holding body 15 (holding member 14) is 0 (V). The potential of the holding body 15 may be a potential slightly deviated from the just intermediate potential between the potential of the positive electrode terminal 19A and the potential of the negative electrode terminal 19B.

Due to such a magnitude relation of the potentials, as illustrated in FIG. 3C, a potential difference occurs between the cell 1 in the vicinity of the positive electrode terminal 19A having a potential of approximately +A (V) and the holding body 15 having a potential of 0 (V).

Due to such a potential difference, as illustrated in FIG. 3C, oxygen ions ($O^{2-}$) in an oxide film formed on the surface of the holding body 15 are attracted to the cell 1 side, and metal ions ($M^+$) in the oxide film are attracted to the holding body 15 side. That is, a reduction reaction of the oxide film occurs in an interface between the fixing material 13 and the holding body 15.

Consequently, this causes a loss of the oxide film on the surface of the holding body 15 in the interface with the fixing material 13, and such a loss causes a gap C to be formed between the fixing material 13 and the holding body 15 as illustrated in FIG. 3D. The formation phenomenon of the gap C is likely to occur between the cell 1 in the vicinity of the positive electrode terminal 19A and the holding body 15 between which there is a large potential difference, and the formation of such a gap C may reduce the durability of the cell stack device 10.

Figure 3E:
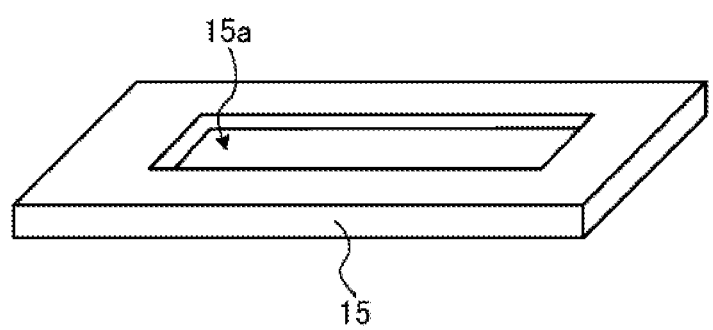
FIG. 3E is a perspective view illustrating another example of a holding body.
Figure 3F:
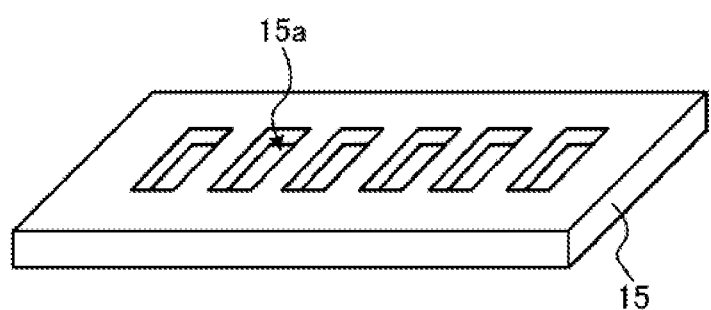
FIG. 3F is a perspective view illustrating another example of a holding body.
Figure 3G:
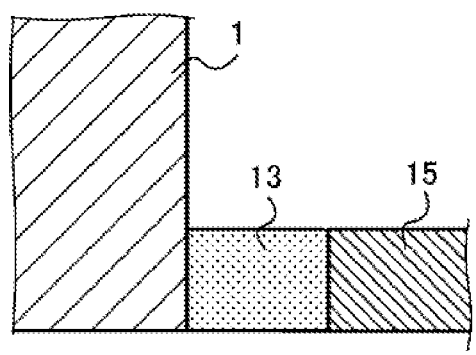
FIG. 3G is an enlarged cross-sectional view of a bonding part between another example of a holding body and a cell (corresponding to FIGS. 3C and 3D).

The holding body 15 may be a flat plate-shaped holding body 15 as illustrated in FIG. 3E. In such a case, for example, an internal space is formed by bonding the gas tank 16 to the lower surface or side surface of the holding body 15 that has a flat plate shape. Furthermore, as illustrated in FIG. 3F, the holding body 15 may be a holding body 15 having a plurality of insertion holes 15a. In such a case, the cells 1 may be inserted into the plurality of insertion holes 15a of the holding body 15 in a one-to-one manner, or a plurality of cells 1 may be inserted into each of the plurality of insertion holes 15a of the holding body 15. FIG. 3G is a cross-sectional view of a bonding portion between the holding body 15 that has a flat plate shape and the cell 1. Furthermore, the holding body 15 may be integrally formed with the gas tank 16. Even in such a holding body 15, the gap C is formed between the fixing material 13 and the holding body 15.

Embodiment

Figure 4A:
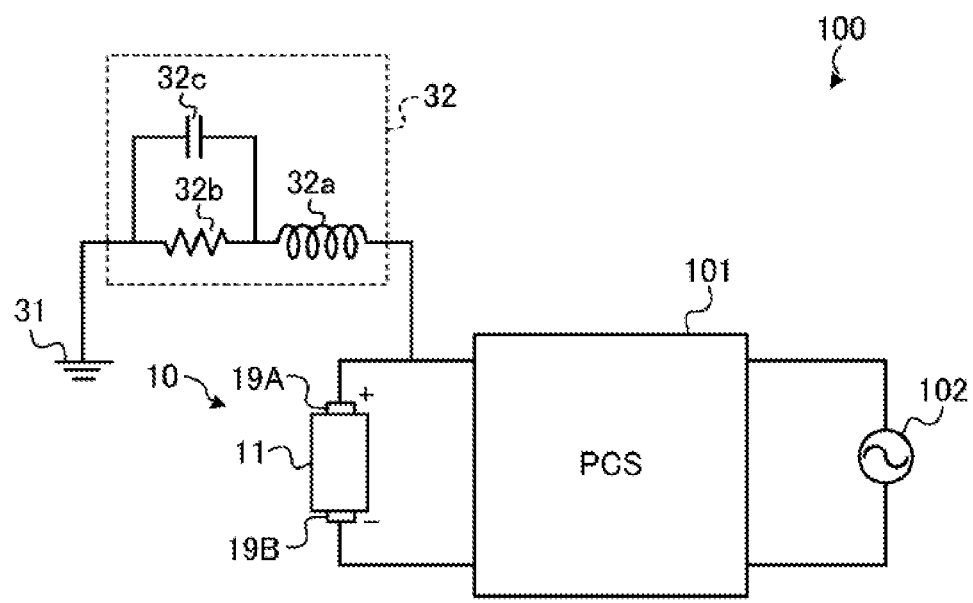
FIG. 4A is a diagram illustrating an example of a power system including the cell stack device according to the embodiment.

Subsequently, the cell stack device 10 according to the embodiment will be described with reference to FIGS. 4A and 4B. FIG. 4A is a diagram illustrating an example of the power system 100 including the cell stack device 10 according to the embodiment, and FIG. 4B is a diagram illustrating a magnitude relationship of potentials of respective parts in the cell stack device 10 according to the embodiment.

As illustrated in FIG. 4A, in the power system 100 according to the embodiment, the positive electrode terminal 19A of the cell stack device 10 and the PCS 101 are connected to a ground potential 31 via a noise reduction unit 32. That is, in the cell stack device 10 according to the embodiment, the positive electrode terminal 19A is grounded by being connected to the ground potential 31.

Figure 4B:
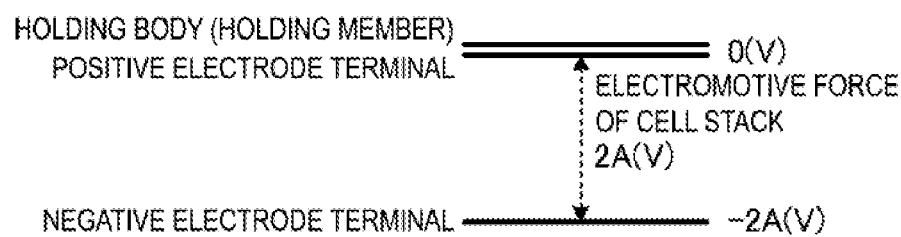
FIG. 4B is a diagram illustrating a magnitude relationship of potentials of respective parts in the cell stack device according to the embodiment.

Consequently, as illustrated in FIG. 4B, the potential of the positive electrode terminal 19A can be set to 0 (V), which is the same as that of the holding body 15 (holding member 14). In such a case, the potential of the negative electrode terminal 19B is −2A (V).

That is, in the embodiment, there is no potential difference between the cell 1 in the vicinity of the positive electrode terminal 19A and the holding body 15 described in the above reference example, which makes it possible to prevent a reduction reaction from occurring in the interface between the fixing material 13 and the holding body 15.

Consequently, according to the embodiment, it is possible to reduce the loss of the oxide film on the surface of the holding body 15 in the interface with the fixing material 13. As a consequence, the gap C is not easily formed between the fixing material 13 and the holding body 15. That is, according to the embodiment, it is possible to improve the durability of the cell stack device 10.

Furthermore, in the embodiment, the noise reduction unit 32 may be provided between the positive electrode terminal 19A and the ground potential 31. In the noise reduction unit 32, for example, a coil 32a and a resistor 32b are connected in series between the positive electrode terminal 19A and the ground potential 31, and a capacitor 32c is connected in parallel with the resistor 32b.

In the embodiment, by providing the noise reduction unit 32 between the positive electrode terminal 19A and the ground potential 31, it is possible to reduce noise included in DC power supplied from the cell stack device 10. Consequently, according to the embodiment, the PCS 101 can stably convert DC power into AC power.

The circuit configuration of the noise reduction unit 32 illustrated in FIG. 4A is merely an example and other circuit configurations can also be adopted.

First Modification

Figure 5A:
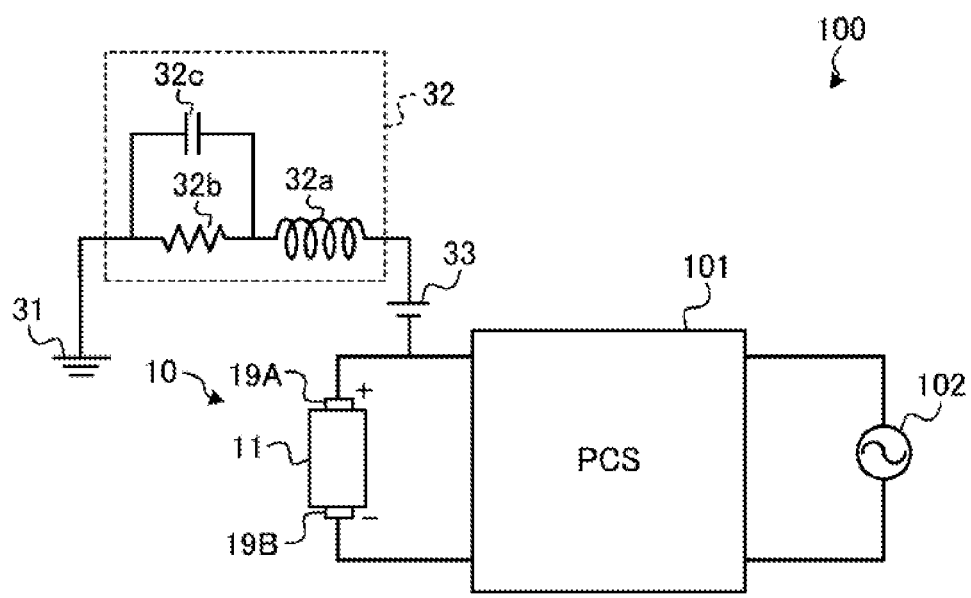
FIG. 5A is a diagram illustrating an example of a power system including a cell stack device according to a first modification of the embodiment.

Subsequently, the cell stack device 10 according to a first modification of the embodiment will be described with reference to FIGS. 5A and 5B. FIG. 5A is a diagram illustrating an example of the power system 100 including the cell stack device 10 according to the first modification of the embodiment, and FIG. 5B is a diagram illustrating a magnitude relationship of potentials of respective parts in the cell stack device 10 according to the first modification of the embodiment.

The first modification is different from the embodiment in that a separate battery 33 is provided between the positive electrode terminal 19A and the ground potential 31. A positive electrode of the battery 33 is connected to the ground potential 31 via the noise reduction unit 32. Furthermore, a negative electrode of the battery 33 is connected to the positive electrode terminal 19A.

Figure 5B:
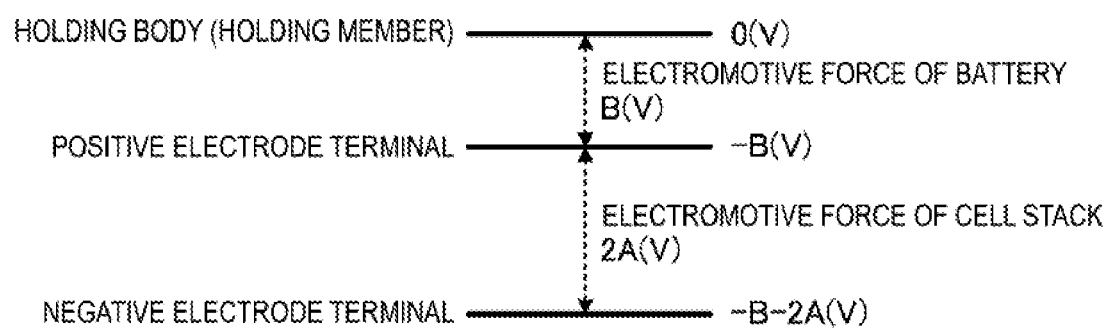
FIG. 5B is a diagram illustrating a magnitude relationship of potentials of respective parts in the cell stack device according to the first modification of the embodiment.

As illustrated in FIG. 5B, when the electromotive force of the battery 33 is B (V), the potential of the positive electrode terminal 19A can be set to −B (V) lower than the potential 0 (V) of the holding body 15 (holding member 14). In such a case, the potential of the negative electrode terminal 19B is −B−2A (V).

That is, in the first modification, since a potential difference opposite to the potential difference described in the above reference example can be generated, an oxidation reaction opposite to the reduction reaction can occur in the interface between the fixing material 13 and the holding body 15.

Consequently, even though the oxide film on the surface of the holding body 15 in the interface with the fixing material 13 may grow due to the oxidation reaction, it is possible to reduce the loss of the oxide film. Therefore, according to the first modification, the gap C is not easily formed between the fixing material 13 and the holding body 15, which makes it possible to improve the durability of the cell stack device 10.

The battery 33 is an example of a negative voltage application unit that applies a negative voltage to the positive electrode terminal 19A. That is, such a negative voltage application unit is not limited to the battery 33, and may have any configuration as long as it can apply a negative voltage to the positive electrode terminal 19A with respect to the ground potential 31.

Furthermore, in the first modification, the noise reduction unit 32 may be provided between the positive electrode terminal 19A and the ground potential 31 as in the embodiment. With this, it is possible to reduce noise included in DC power supplied from the cell stack device 10, and thus the PCS 101 can stably convert DC power into AC power.

Module

Figure 6:
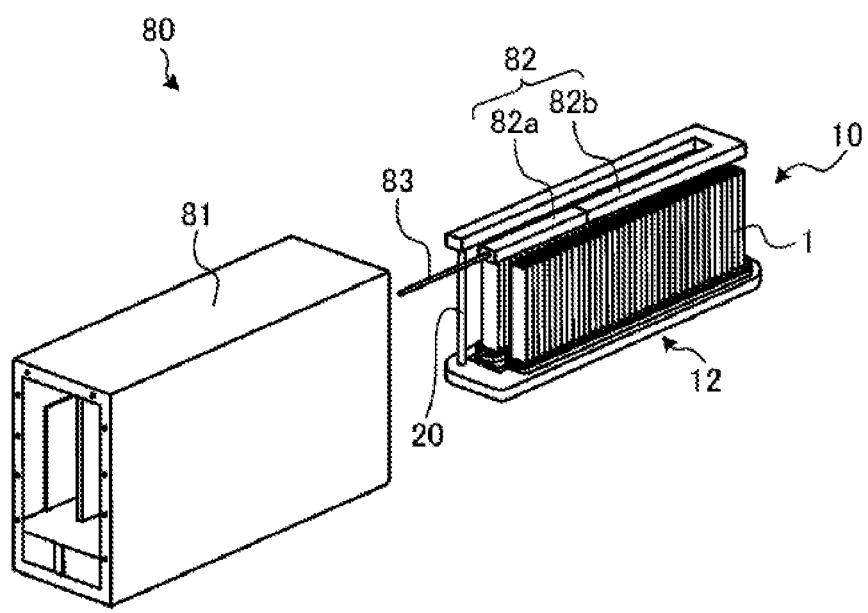
FIG. 6 is an external appearance perspective view illustrating an example of a module according to the embodiment.

Next, a module 80 according to the embodiment of the present disclosure using the cell stack device 10 described above will be described with reference to FIG. 6. FIG. 6 is an external appearance perspective view illustrating the module 80 according to the embodiment, and illustrates a state in which a front surface and a rear surface, which are a part of a housing container 81, are taken out and the cell stack device 10 of a fuel cell housed inside is taken out to the rear.

As illustrated in FIG. 6, the module 80 includes the housing container 81 and the cell stack device 10 housed in the housing container 81. The reformer 82 is disposed above the cell stack device 10.

The reformer 82 generates fuel gas by reforming raw fuel such as natural gas and kerosene, and supplies the generated fuel gas to the cell 1. The raw fuel is supplied to the reformer 82 through a raw fuel supply pipe 83. The reformer 82 may include a vaporizing part 82a for vaporizing water and a reforming part 82b. The reforming part 82b includes a reforming catalyst (not illustrated) and reforms the raw fuel into the fuel gas. The reformer 82 such as that described above can perform steam reforming which is a highly efficient reforming reaction.

The fuel gas generated by the reformer 82 is supplied to the gas flow paths 2a (see FIG. 1A) of the cell 1 through the gas circulation pipe 20, the gas tank 16, and the fixing member 12.

Furthermore, in the module 80 having the configuration described above, the temperature in the module 80 during normal power generation is 500° C. to 1.000° C. due to the combustion of gas and power generation of the cells 1.

In the module 80 such as that described above, by providing the cell stack device 10 having high durability, which is less likely to form the gap C as described above, the module 80 having high durability can be acquired.

Module Housing Device

Figure 7:
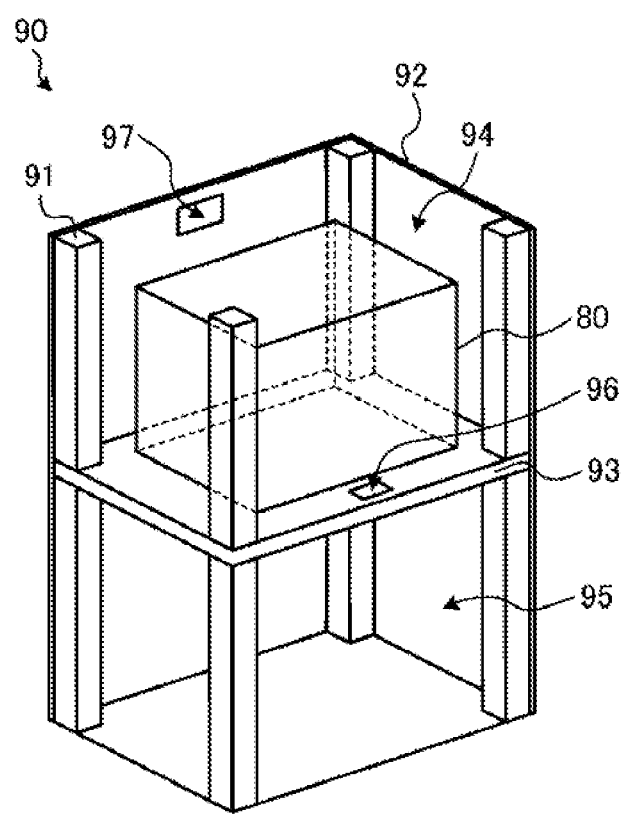
FIG. 7 is an exploded perspective view schematically illustrating an example of a module housing device according to the embodiment.

FIG. 7 is an exploded perspective view illustrating an example of a module housing device 90 according to the embodiment. The module housing device 90 according to the embodiment includes an outer case, the module 80 illustrated in FIG. 6, and an auxiliary device (not illustrated). The auxiliary device operates the module 80. The module 80 and the auxiliary device are housed in the outer case. FIG. 7 does not illustrate a part of the configuration.

The outer case of the module housing device 90 illustrated in FIG. 7 has columns 91 and an outer plate 92. A partition plate 93 vertically divides the inside of the outer case. The space above the partition plate 93 in the outer case is a module housing chamber 94 for housing the module 80, and the space below the partition plate 93 in the outer case is an auxiliary device housing chamber 95 for housing the auxiliary device that operates the module 80. FIG. 7 does not illustrate the auxiliary device that is housed in the auxiliary device housing chamber 95.

Furthermore, the partition plate 93 has an air circulation port 96 for causing the air in the auxiliary device housing chamber 95 to flow toward the module housing chamber 94. The outer plate 92 constituting the module housing chamber 94 has an exhaust port 97 for exhausting the air in the module housing chamber 94.

In the module housing device 90 such as that described above, by providing the module housing chamber 94 with the module 80 having high durability as described above, the module housing device 90 having high durability can be acquired.

So far, although the present disclosure has been described in detail, the present disclosure is not limited to the aforementioned embodiment, and various changes, improvements, and the like can be made without departing from the gist of the present disclosure.

The aforementioned embodiment has exemplified a vertical stripe type cell stack device in which so-called "vertical stripe type" cells are stacked, the cells being provided with only one power generation element part including a fuel electrode, a solid electrolyte layer, and an air electrode on the surface of a support substrate. The present disclosure can be applied to a horizontal stripe type cell stack device in which so-called "horizontal stripe type" cells are stacked, the cells including power generation element parts provided at a plurality of locations separate from each other on the surface of a support substrate, adjacent power generation element parts being electrically connected to each other.

Furthermore, the aforementioned embodiment has exemplified the case where a hollow flat plate type support substrate is used. The present disclosure can also be applied to a cell stack device using a cylindrical support substrate. Furthermore, the present disclosure can also be applied to a flat plate type cell stack device in which a so-called "flat plate type" cell is stacked in the thickness direction.

Furthermore, the aforementioned embodiment gives an example in which a fuel electrode is provided on a support substrate and an air electrode is disposed on the surface of a cell. The present disclosure can also be applied to an opposite arrangement, that is, a cell stack device in which an air electrode is provided on a support substrate and a fuel electrode is disposed on the surface of a cell.

Furthermore, in the aforementioned embodiment, a fuel cell, a fuel cell stack device, a fuel cell module, and a fuel cell device are illustrated as examples of the "cell", the "cell stack device", the "module", and the "module housing device"; however, in other examples, an electrolytic cell, an electrolytic cell stack device, an electrolytic module, and an electrolytic device may be the "cell", the "cell stack device", the "module", and the "module housing device", respectively.

Figure 8:
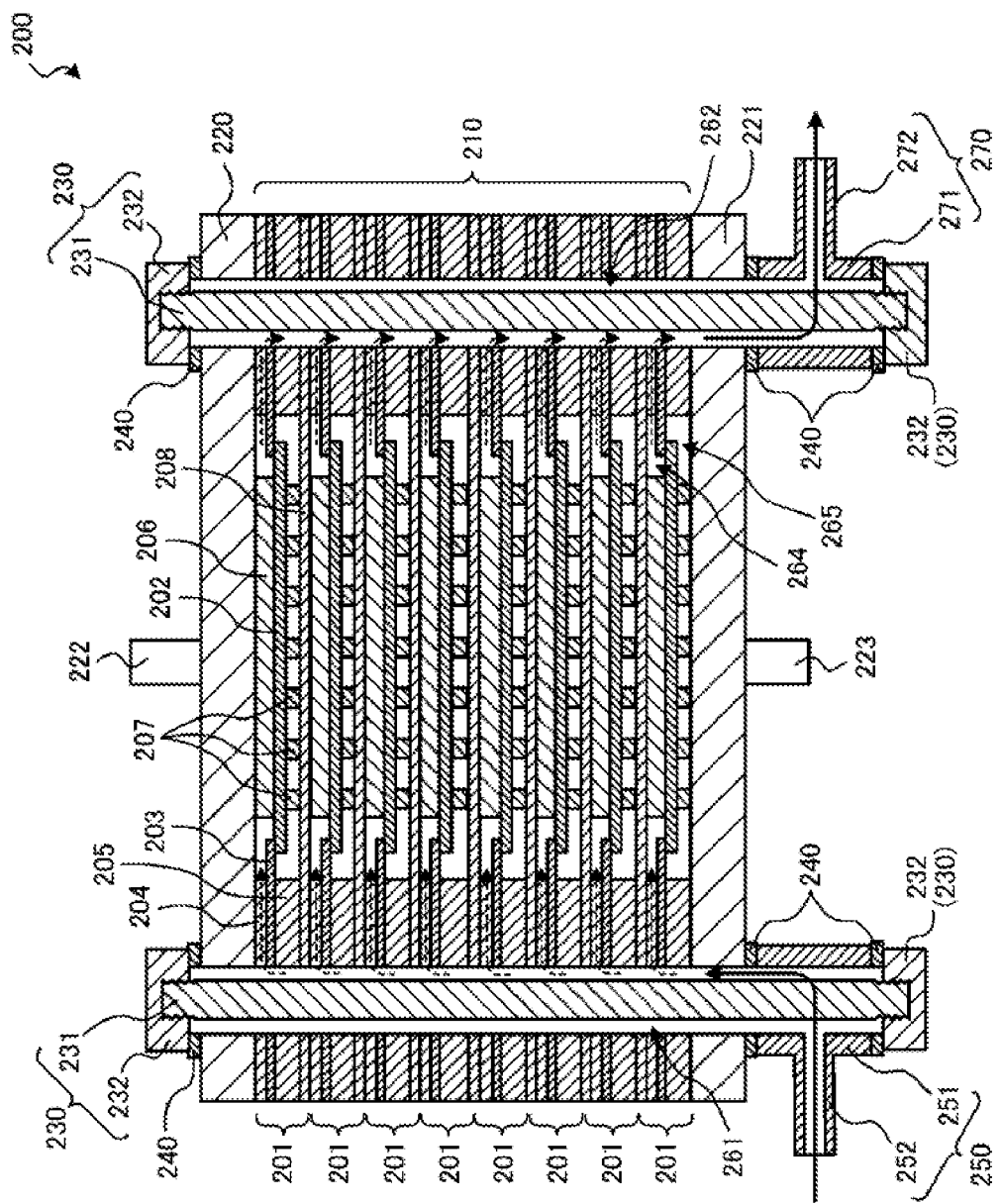
FIG. 8 is a cross-sectional view illustrating a cell stack device according to a second modification of the embodiment.

FIG. 8 is a cross-sectional view illustrating a cell stack device 200 according to a second modification of the embodiment. As illustrated in FIG. 8, the cell stack device 200 according to the second modification includes a cell stack 210 in which a plurality of plate-shaped cells 201 are stacked. Furthermore, in the cell stack device 200 according to the second modification, the cell stack 210 is interposed between a positive-electrode-side end current collection member 220 and a negative-electrode-side end current collection member 221.

The cell 201 of the second modification has an element part 202, a separator 203, an air-electrode-side frame 204, a fuel-electrode-side frame 205, an air-electrode-side current collector 206, a fuel-electrode-side current collector 207, and an interconnector 208.

Figure 9:
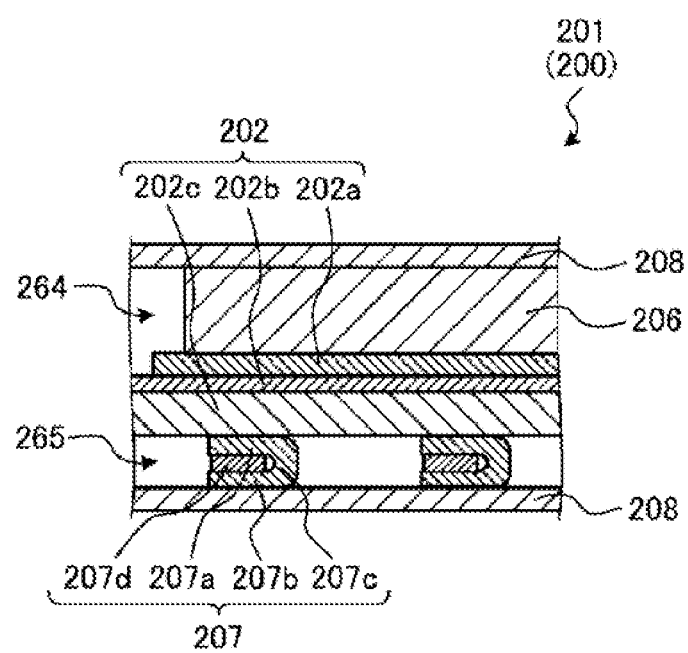
FIG. 9 is an enlarged cross-sectional view illustrating a structure of a cell according to the second modification of the embodiment.

FIG. 9 is an enlarged cross-sectional view illustrating a structure of the cell 201 according to the second modification of the embodiment. As illustrated in FIG. 9, the element part 202 of the second modification has an air electrode 202a, a solid electrolyte layer 202b located on a lower surface of the air electrode 202a, and a fuel electrode 202c located on a lower surface of the solid electrolyte layer 202b. The air electrode 202a is located on a side of the element part 202 in contact with the air-electrode-side current collector 206, and the fuel electrode 202c is located on a side of the element part 202 in contact with the fuel-electrode-side current collector 207.

FIG. 8 will be described again. The separator 203 is a frame-shaped member having a through hole penetrating the separator 203 in the vertical direction near the center thereof. The material of the separator 203 may be, for example, a metal. A peripheral portion of the through hole in the separator 203 faces a peripheral edge portion of the surface of the solid electrolyte layer 202b (see FIG. 9) on a side of the air electrode 202a (see FIG. 9). The separator 203 is bonded to the solid electrolyte layer 202b at the facing portion.

The separator 203 divides the cell 201 into an air chamber 264 facing the air electrode 202a and a fuel chamber 265 facing the fuel electrode 202c (see FIG. 9), which makes it difficult for gas to leak from one electrode side to the other electrode side at the peripheral edge portion of the element part 202.

The air-electrode-side frame 204 is a frame-shaped member having a through hole penetrating the air-electrode-side frame 204 in the vertical direction near the center thereof. The material of the air-electrode-side frame 204 may be, for example, an insulator such as mica. The air-electrode-side frame 204 comes into contact with a peripheral edge portion of a surface on a side of the separator 203, which is opposite to a side of the separator 203, which faces the solid electrolyte layer 202b, and a peripheral edge portion of a surface on a side of the interconnector 208, which faces the air electrode 202a.

Since the cell 201 located at the uppermost position in the cell stack 210 does not have the upper interconnector 208, the air-electrode-side frame 204 in the cell 201 comes into contact with the end current collection member 220.

The through hole of the air-electrode-side frame 204 constitutes the air chamber 264 facing the air electrode 202a. Furthermore, the air-electrode-side frame 204 electrically insulates adjacent interconnectors 208 from each other.

The fuel-electrode-side frame 205 is a frame-shaped member having a through hole penetrating the fuel-electrode-side frame 205 in the vertical direction near the center thereof. The material of the fuel-electrode-side frame 205 may be, for example, metal. The through hole of the fuel-electrode-side frame 205 constitutes the fuel chamber 265 facing the fuel electrode 202c.

The fuel-electrode-side frame 205 comes into contact with a peripheral edge portion of a surface on a side of the separator 203, which faces the solid electrolyte layer 202b, and a peripheral edge portion of a surface on a side of the interconnector 208, which faces the fuel electrode 202c.

The air-electrode-side current collector 206 is disposed in the air chamber 264. The air-electrode-side current collector 206 is composed of a plurality of columnar conductive members arranged at predetermined intervals. The material of the air-electrode-side current collector 206 may be, for example, stainless steel.

The air-electrode-side current collector 206 comes into contact with a surface on a side of the air-electrode 202a, which is opposite to a side of the air electrode 202a, which faces the solid electrolyte layer 202b, and a surface on a side of the interconnector 208, which faces the air electrode 202a. Since the cell 201 located at the uppermost position in the cell stack 210 does not have the upper interconnector 208, the air-electrode-side current collector 206 in the cell 201 comes into contact with the end current collection member 220.

That is, the air-electrode-side current collector 206 electrically connects between the air electrode 202a and the interconnector 208, or between the air electrode 202a and the end current collection member 220. The air-electrode-side current collector 206 and the interconnector 208 may be formed as an integrated member.

The fuel-electrode-side current collector 207 is disposed in the fuel chamber 265. The fuel-electrode-side current collector 207 is composed of a plurality of columnar conductive members arranged at predetermined intervals. The material of the fuel-electrode-side current collector 207 may be, for example, stainless steel. As illustrated in FIG. 9, the fuel-electrode-side current collector 207 may have an electrode facing part 207a, an interconnector facing part 207b, a connection part 207c, and a spacer 207d, for example.

The electrode facing part 207a faces the fuel electrode 202c of the element part 202. The interconnector facing part 207b faces the interconnector 208 (or the end current collection member 221). The connection part 207c connects the electrode facing part 207a and the interconnector facing part 207b. The electrode facing part 207a, the interconnector facing part 207b, and the connection part 207c may all be made of metal, or may be integrally formed with one another, for example.

The spacer 207d is located between the electrode facing part 207a and the interconnector facing part 207b. The material of the spacer 207d may be, for example, mica. By disposing the spacer 207d in the fuel-electrode-side current collector 207, the fuel-electrode-side current collector 207 can easily follow the deformation of the cell 201 due to a temperature cycle, a pressure fluctuation of the reaction gas, and the like.

Consequently, the cell 201 having the fuel-electrode-side current collector 207 as illustrated in FIG. 9 can maintain a good electrical connection between the fuel electrode 202c and the interconnector 208 (or the end current collection member 221) via the fuel-electrode-side current collector 207.

FIG. 8 will be described again. The interconnector 208 is a flat plate-shaped conductive member. The material of the interconnector 208 may be, for example, stainless steel. The interconnector 208 ensures electrical connection between adjacent ones of the cells 201. Furthermore, the interconnector 208 makes it difficult for the reaction gas to be mixed between adjacent ones of the cells 201, that is, makes it difficult for the gas to leak from one cell 201 side to the other cell 201 side. In the second modification, adjacent ones of the cells 201 share one interconnector 208.

The cell 201 in contact with the end current collection member 220 or the end current collection member 221 has no interconnector 208 because the end current collection member 220 or the end current collection member 221 has the function of the interconnector 208.

A positive electrode terminal 222 functions as a positive electrode when power generated by the cell stack 210 is output to the outside, and is electrically connected to the positive-electrode-side end current collection member 220 in the cell stack 210. A negative electrode terminal 223 functions as a negative electrode when power generated by the cell stack 210 is output to the outside, and is electrically connected to the negative-electrode-side end current collection member 221 in the cell stack 210.

The cell stack device 200 has communication holes 261 and 262 through which the end current collection member 220, the cell stack 210, and the end current collection member 221 communicate with one another, and metal bolts 231 are inserted into the communication holes 261 and 262, respectively.

Furthermore, metal nuts 232 are fitted to the bolts 231 exposed to the outside from the end current collection member 220 and the end current collection member 221, so that the plurality of cells 201 are held between the end current collection member 220 and the end current collection member 221. That is, in the second modification, the bolts 231 and the nuts 232 form holding members 230 that hold the plurality of cells 201.

A fixing material 240 is located between the end current collection member 220 and the holding member 230 and between the end current collection member 221 and the holding member 230. The fixing material 240 of the second modification may be made of the same material as that of the fixing material 13 of the embodiment, for example. The fixing material 240 of the second modification is not limited to the same material as that of the fixing material 13 of the embodiment, and may be made of an insulating sheet, for example.

Either the end current collection member 220 or the end current collection member 221 may be formed with a screw hole. For example, when the end current collection member 220 is formed with a screw hole, the bolt 231 may be screwed into the screw hole. The inner wall of the screw hole and the bolt 231 may be in direct contact with each other, or the fixing material 240 may be located between the inner wall of the screw hole and the bolt 231. In such a case, the bolt 231 is exposed to the outside from the end current collection member 221 and the metal nut 232 is fitted to the exposed bolt 231. The fixing material 240 is located between the end current collection member 221 and the holding member 230.

Instead of the bolt 231 and the nut 232, a bolt having a flange portion may be used as the holding member 230. The bolt having a flange portion is screwed into the screw hole of the end current collection member 220, and the fixing material 240 is located between the flange portion of the holding member 230 and the end current collection member 221. The screw hole may go through the end current collection member 220, or may have a bottom portion without going through the end current collection member 220.

Figure 10:
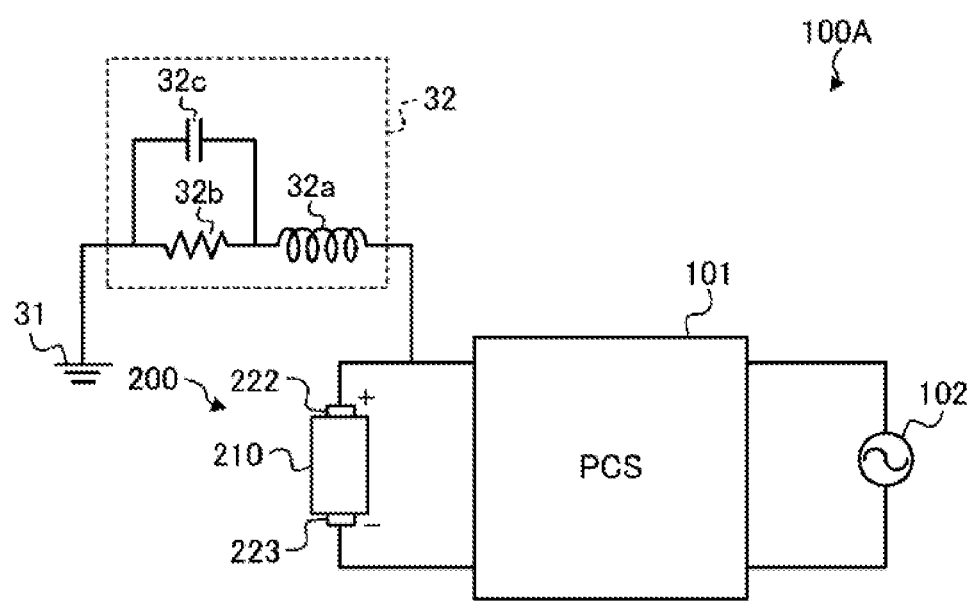
FIG. 10 is a diagram illustrating an example of a power system including the cell stack device according to the second modification of the embodiment.

FIG. 10 is a diagram illustrating an example of a power system 100A including the cell stack device 200 according to the second modification of the embodiment. As illustrated in FIG. 10, in the power system 100A according to the second modification, the positive electrode terminal 222 of the cell stack device 200 and the PCS 101 are connected to the ground potential 31 via the noise reduction unit 32.

That is, in the cell stack device 200 according to the second modification, the positive electrode terminal 222 is grounded by being connected to the ground potential 31.

With this, as illustrated in FIG. 4B, the potential of the positive electrode terminal 222 can be set to 0 (V), which is the same as that of the holding member 230. The positive electrode terminal 222 and the end current collection member 220 may be electrically connected to the holding member 230. In such a case, the potential of the negative electrode terminal 223 is −2A (v).

Consequently, in the second modification, there is no potential difference between the positive electrode terminal 222 and the holding member 230 as in the embodiment, which makes it possible to prevent a reduction reaction from occurring in the interface between the fixing material 240 and the holding member 230.

Consequently, according to the second modification, it is possible to reduce the loss of the oxide film on the surface of the holding member 230 in the interface with the fixing material 240. As a consequence, a gap is not easily formed between the fixing material 240 and the holding member 230. That is, according to the second modification, it is possible to improve the durability of the cell stack device 200.

Figure 11:
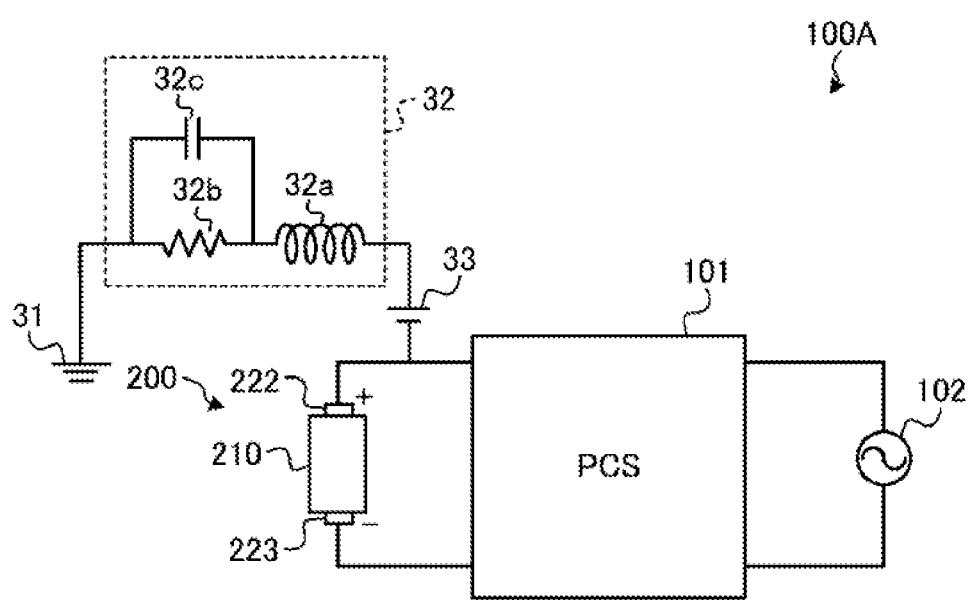
FIG. 11 is a diagram illustrating another example of a power system including the cell stack device according to the second modification of the embodiment.

The power system 100A including the cell stack device 200 according to the second modification is not limited to the example in FIG. 10. FIG. 11 is a diagram illustrating another example of the power system 100A including the cell stack device 200 according to the second modification of the embodiment.

The example in FIG. 11 is different from that in FIG. 10 in that a separate battery 33 is provided between the positive electrode terminal 222 and the ground potential 31. A positive electrode of the battery 33 is connected to the ground potential 31 via the noise reduction unit 32, and a negative electrode of the battery 33 is connected to the positive electrode terminal 222.

Consequently, even in the second modification, as in the first modification described above, an oxidation reaction opposite to a reduction reaction can occur in the interface between the fixing material 240 and the holding member 230. That is, in the example in FIG. 11, even though the oxide film on the surface of the holding member 230 in the interface with the fixing material 240 grows due to the oxidation reaction, it is possible to reduce the loss of the oxide film.

Consequently, according to the example in FIG. 11, a gap is not easily formed between the fixing material 240 and the holding member 230, which makes it possible to improve the durability of the cell stack device 200.

Furthermore, in the examples in FIG. 10 and FIG. 11, the noise reduction unit 32 may be provided between the positive electrode terminal 222 and the ground potential 31 as in the embodiment. Consequently, it is possible to reduce noise included in DC power supplied from the cell stack device 200, and thus the PCS 101 can stably convert DC power into AC power.

The remaining parts in the cell stack device 200 illustrated in FIG. 8 will be described. The communication hole 261 and the communication hole 262 of the holding member 230 may be, for example, simple bolt holes through which bolts for fixing the cell 201 are inserted. The communication hole 261 may function as a gas supply manifold that supplies the reaction gas or the oxygen-containing gas to the plurality of cells 201. The communication hole 262 may function as a gas discharge manifold that discharges the reaction gas or the oxygen-containing gas from the plurality of cells 201. Hereinafter, a case where the communication hole 261 functions as an oxygen supply manifold that supplies oxygen-containing gas to the plurality of cells 201 and the communication hole 262 functions as an oxygen discharge manifold that discharges the oxygen-containing gas from the plurality of cells 201 as illustrated in FIG. 8 will be described.

The oxygen-containing gas flowing through the oxygen supply manifold is supplied from the communication hole 261 to the air chamber 264 via a flow path (not illustrated) formed in the air-electrode-side frame 204. Furthermore, the oxygen-containing gas discharged from the air chamber 264 flows into the communication hole 262 via a flow path (not illustrated) formed in the air-electrode-side frame 204.

A gas passage member 250 is located at an inlet of the communication hole 261. The gas passage member 250 has a body 251 and a branch part 252, and is interposed between the end current collection member 221 and the nut 232.

A gas passage member 270 is located at an outlet of the communication hole 262. The gas passage member 270 has a body 271 and a branch part 272, and is interposed between the end current collection member 221 and the nut 232.

Although not illustrated in FIG. 8, the cell stack device 200 may have communication holes different from the communication hole 261 that supplies the oxygen-containing gas to the plurality of cells 201 and the communication hole 262 that discharges the oxygen-containing gas from the plurality of cells 201. The cell stack device 200 may have, for example, a communication hole that functions as a fuel supply manifold that supplies fuel gas to the plurality of cells 201 or a fuel discharge manifold that discharges the fuel gas from the plurality of cells 201. Furthermore, the cell stack device 200 may have communication holes that do not have the functions of supplying and discharging gas.

Moreover, the cell stack device 200 may have a communication hole through which the bolt 231 is not inserted, in addition to a communication hole through which the bolt 231 is inserted. The communication hole through which the bolt 231 is not inserted may function as a gas supply manifold or a gas discharge manifold.

Furthermore, in the aforementioned embodiment, the example in which the cell stacks 11A and 11B in the cell stack device 10 are connected in series has been described; however, the cell stacks 11A and 11B may be connected in parallel to form one battery.

Furthermore, in the aforementioned embodiment, the example in which the holding member 14 is grounded has been described; however, the holding member 14 does not necessarily have to be grounded. Even in such a case, by setting the potential of the positive electrode terminal 19A to be not more than that of the holding member 14, the gap C is not easily formed between the fixing material 13 and the holding body 15, which makes it possible to improve the durability of the cell stack device 10.

As described above, the cell stack device 10 (200) according to the embodiment includes the cell stack 11 (210), the holding member 14 (230), and the positive electrode terminal 19A (222). The cell stack 11 (210) is constructed by stacking the plurality of cells 1 (201). The holding member 14 (230) holds the cells 1 (201). The positive electrode terminal 19A (222) functions as a positive electrode when power generated by the cell stack 11 (210) is output to the outside. Furthermore, the potential of the positive electrode terminal 19A (222) is not more than that of the holding member 14 (230). With this, it is possible to improve the durability of the cell stack device 10 (200).

Furthermore, in the cell stack device 10 (200) according to the embodiment, the positive electrode terminal 19A (222) and the holding member 14 (230) have the same potential. With this, it is possible to improve the durability of the cell stack device 10 (200).

Furthermore, in the cell stack device 10 (200) according to the embodiment, the potential of the positive electrode terminal 19A (222) is lower than that of the holding member 14 (230). With this, it is possible to improve the durability of the cell stack device 10 (200).

Furthermore, in the cell stack device 10 (200) according to the embodiment, the positive electrode terminal 19A (222) is connected to the ground potential 31. In addition, in the cell stack device 10 (200) according to the embodiment, the noise reduction unit 32 that reduces noise is located between the positive electrode terminal 19A (222) and the ground potential 31. With this, the PCS 101 can stably convert DC power into AC power.

Furthermore, the module 80 according to the embodiment is constructed by housing the cell stack device 10 (200) described above in the housing container 81. With this, it is possible to acquire a module 80 having high durability.

Furthermore, the module housing device 90 according to the embodiment is constructed by housing, in an outer case, the module 80 described above and an auxiliary device for operating the module 80. With this, it is possible to acquire a module housing device 90 having high durability.

Noted that the embodiment disclosed herein is exemplary in all respects and not restrictive. Indeed, the aforementioned embodiment can be embodied in a variety of forms. Furthermore, the aforementioned embodiment may be omitted, replaced, or changed in various forms without departing from the scope of the appended claims and the purpose thereof.

The invention claimed is:

1. A cell stack device comprising:
a plurality of cell stacks constructed by stacking a plurality of cells;
a holding member configured to hold the cells; and
a positive electrode terminal electrically connected to a highest potential side of the plurality of cell stacks and configured to function as a positive electrode of the cell stack device when power generated by the plurality of cell stacks is output to the outside, wherein
a potential of the positive electrode terminal is not more than a potential of the holding member.

2. The cell stack device according to claim 1, wherein the potential of the positive electrode terminal is equal to the potential of the holding member.

3. The cell stack device according to claim 1, wherein the potential of the positive electrode terminal is lower than the potential of the holding member.

4. The cell stack device according to claim 1, wherein,
the positive electrode terminal is connected to a ground potential, and
a noise reduction unit for reducing noise is located between the positive electrode terminal and the ground potential.

5. A module comprising the cell stack device according to claim 1 that is located in a housing container.

6. A module housing device comprising, in an outer case, the module according to claim 5 and an auxiliary device for operating the module.

* * * * *